United States Patent
Prunier et al.

[19]

[11] Patent Number: 5,870,593
[45] Date of Patent: Feb. 9, 1999

[54] METHOD AND PROGRAMMABLE DEVICE FOR GENERATING VARIABLE WIDTH PULSE TRAINS

[75] Inventors: Jacques Prunier, Sassenage; Laurent Lusinchi, Saint Egreve, both of France

[73] Assignee: SGS-Thomson Microelectronics S.A., Saint Genis, France

[21] Appl. No.: 861,357

[22] Filed: May 21, 1997

[30] Foreign Application Priority Data

May 24, 1996 [FR] France ................................ 96 06689

[51] Int. Cl.⁶ ........................................................ G06F 1/04
[52] U.S. Cl. ............................................................ 395/555
[58] Field of Search ................................. 395/551, 555, 395/556, 557; 331/172, 173; 375/237–239

[56] References Cited

U.S. PATENT DOCUMENTS

| | | | |
|---|---|---|---|
| 4,959,810 | 9/1990 | Darbee et al. | 364/900 |
| 4,977,895 | 12/1990 | Tannenbaum | 607/46 |
| 4,999,622 | 3/1991 | Amano et al. | 340/825 |
| 5,060,303 | 10/1991 | Wilmoth | 359/152 |
| 5,291,154 | 3/1994 | Sconce | 332/149 |
| 5,319,487 | 6/1994 | Sato et al. | 359/142 |
| 5,416,627 | 5/1995 | Wilmoth | 359/159 |
| 5,424,858 | 6/1995 | Gillotte | 359/143 |

OTHER PUBLICATIONS

French Search Report from French Patent Application 96 06689, filed May 24, 1996.

Philips Technical Publication, No. 167, Mar. 22, 1985, pp. 1–8, "Low–Power Remote Control IR Transmitter And Receiver Preamplifiers".

*Primary Examiner*—Thomas M. Heckler
*Attorney, Agent, or Firm*—Wolf, Greenfield & Seaks, P.C.

[57] ABSTRACT

The present invention relates to a method for generating pulse trains by means of a microprocessor, consisting of generating an envelope signal by means of a timer which is programmable by a CPU, the width of a square wave of the envelope signal corresponding to the width of the pulse trains, generating a carrier signal having a predetermined frequency, and modulating the envelope signal with the carrier.

20 Claims, 2 Drawing Sheets

METHOD AND PROGRAMMABLE DEVICE FOR GENERATING VARIABLE WIDTH PULSE TRAINS

BACKGROUND OF THE INVENTION

1. Field of the Invention

The present invention relates to the generation of pulse trains by means of a microprocessor. It more specifically relates to the generation of variable width trains of variable frequency digital pulses, the respective widths of the trains and the pulses being programable by means of a CPU of a microprocessor. Such generation of pulse trains is used, for example, in infrared remote controls for monitoring infrared-emitting diodes, the sequence in which the pulse trains are generated and/or their number of pulses constituting a control code likely to be decoded by a receiver of the transmitted infrared signals.

More generally, the present invention applies to the generation of a discontinuous pulse sequence for which it is desired to program both the pulse frequency and the width of the trains or successive pulse series.

2. Discussion of the Related Art

FIG. 1 shows, partially and in the form of a block-diagram, an example of a conventional implementation of a programable pulse train generator.

Such a generator includes a CPU 1 for executing an instruction program previously stored in a memory (not shown). CPU 1 conventionally is associated with a timer 2 which can be used as a time base for exchanges between the microprocessor and an external peripheral, for example, an infrared-emitting diode (not shown).

CPU 1 is also associated with a prescaler 3, the function of which is to shape an external clock CLKE and deliver to CPU 1 and timer 2 an operating clock CLK0. Prescaler PS 3 is programmable via a first register (PS-REG) 4 to set the division rate of external clock CLKE and, thus, the operating frequency of CPU 1.

Timer 2 is programmable by CPU 1, via certain bits of register 4 and of a second register (T-REG) 5 which are programmed by CPU 1. The timing frequency is given by clock signal CLK0.

CPU 1 communicates with registers 4 and 5 via an address bus 6, a data bus 7 and a control bus (not shown). Although not shown for the sake of clarity, CPU 1 also communicates via the buses with timer 2 to ensure its control as well as with other conventional components (not shown) of the microprocessor.

Timer 2, for example, comprises a digital flip-flop counter (not shown) associated with a comparator (not shown) which compares the value issued by the flip-flop counter with a threshold stored in register 5. When the threshold is reached, timer 2 positions its output signal S to a high or low state according to the state of a control bit contained in register 4. Timer 2 is reset by a signal ResetC from CPU 1.

FIG. 2 shows, in the form of timing diagrams, an example of a signal S comprising a sequence of pulse trains obtained by means of a generator such as shown in FIG. 1. Sequence S here is comprised of three trains T1, T2, and T3 respectively including three, two and four pulses I. The rising and falling edges of each pulse I are generated by the circuit such as shown in FIG. 1, that is, for each state switching of signal S, CPU 1 must load into registers 4 and 5, respectively, a control bit indicating the high or low state which is to be adopted by signal S at the end of the previous state and a timing threshold determining the time position of the following edge. In the example shown, all pulses I have the same width. In the application to infrared remote controls, the pulse frequency generally is constant for a particular train sequence. However, the width and frequency of the pulses may be adjustable. Further, the pulse width generally corresponds to a shape factor (pulse width for one period) ranging between 30 and 50% of the pulse period for the entire sequence.

Signal CLK0 has not been shown in FIG. 2. It should be noted that the frequency of signal CLK0 is clearly higher than the frequency of the pulses I of a train. A higher frequency of CLK0 signal is needed because, in order to program registers 4 and 5, CPU 1 has to perform two programming cycles between each pulse edge of signal S while each programming cycle requires several clock cycles. Thus, the need for programming registers 4 and 5 prior to each desired edge of signal S, takes CPU 1 a considerable length of time. As a result, CPU 1 is not available to perform other tasks. This is a disadvantage of conventional generators such as the one shown in FIG. 1.

U.S. Pat. No. 5,319,487 discloses a pulse train generator in which an envelope signal is modulated by a fixed frequency carrier. That carrier is generated independently from the envelope signal which is obtained by an encoder controlled by a keyboard. A drawback of that generator is that the envelope and carrier signals are not synchronized with each other. Therefore some head and tail carrier pulses may be shortened during modulation, causing loss of information. Another drawback is that the pulse train generator is not versatile and cannot be tuned to different carrier frequencies.

SUMMARY OF THE INVENTION

The present invention aims at overcoming this disadvantage by providing a method and a programmable device for generating digital pulse trains which minimize the use of the CPU.

The present invention also aims at making the pulse frequency independent from the operating frequency of the CPU.

To achieve these objects, the present invention provides a method for generating pulse trains by means of a microprocessor, comprising the steps of:

generating an envelope signal by means of a timer which is programmable by a CPU, the width of a square wave of the envelope signal corresponding to the width of the pulse trains;

generating a carrier signal having a predetermined frequency; and modulating the envelope signal with the carrier.

According to an embodiment of the present invention, the carrier is synchronous with the envelope signal.

According to an embodiment of the present invention, the width of a square wave of the envelope signal is an integer multiple of the carrier period.

According to an embodiment of the present invention, the carrier frequency is programmable by the CPU.

According to an embodiment of the present invention, the carrier is obtained by dividing the frequency of an external clock signal.

According to an embodiment of the present invention, the carrier is obtained by dividing the frequency of a clock signal of the CPU.

The present invention also relates to a pulse train generator including a microprocessor provided with a CPU and a timer, and a programmable frequency divider issuing a carrier for modulating an envelope signal generated by the timer.

According to an embodiment of the present invention, an output of the timer issuing the envelope signal is sent on an input of a flip-flop, a clock input of which receives the carrier supplied by the programmable divider, an output of the flip-flop being sent on a first input of an AND-type logic gate, a second input of which receives the carrier and an output of which issues the pulse trains.

According to an embodiment of the present invention, the programmable divider includes a reset input receiving the envelope signal generated by the timer.

According to an embodiment of the present invention, the CPU is monitored by a clock signal issued by a first prescaler of an external frequency, the programmable divider being associated with a second prescaler of the external frequency.

BRIEF DESCRIPTION OF THE DRAWINGS

The foregoing and other objects, characteristics and advantages of the present invention will be discussed in detail in the following non-limiting description of specific embodiments of the present invention, taken in conjunction with the accompanying drawings, among which.

DETAILED DESCRIPTION

Figure 1:
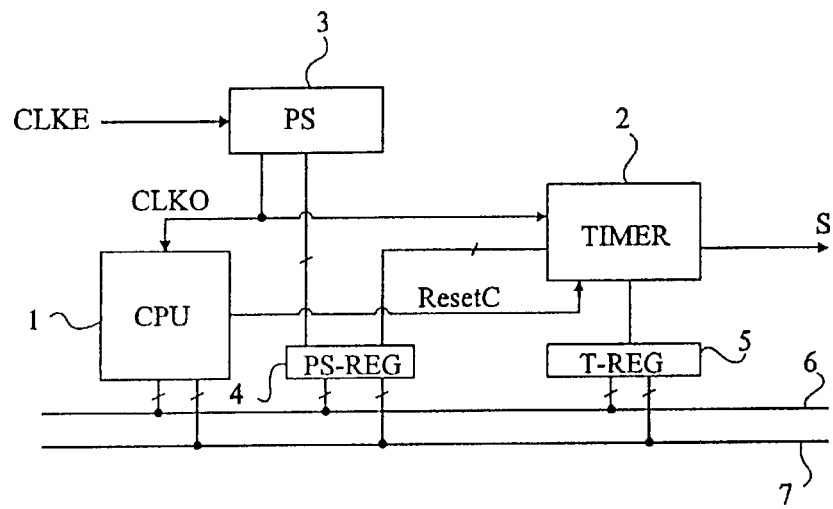
FIG. 1 is a block diagram of a conventional generator.
Figure 2:
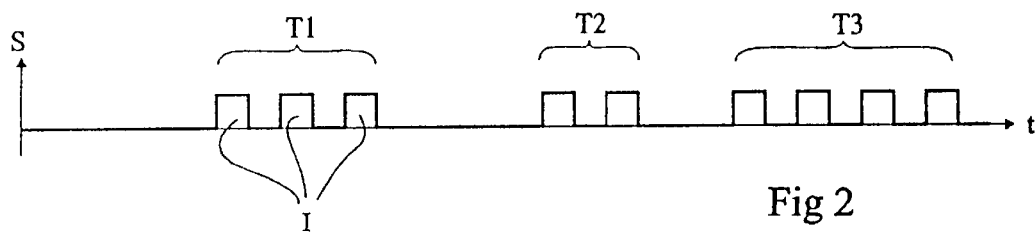
FIG. 2 is a time diagram of pulse trains produced by the conventional generator shown in FIG. 1.

For clarity, the same components have been referred to by the same references in the different drawings. Also, only the generator components which are necessary for the understanding of the present invention have been shown in the drawings and will be described hereafter.

Figure 3:
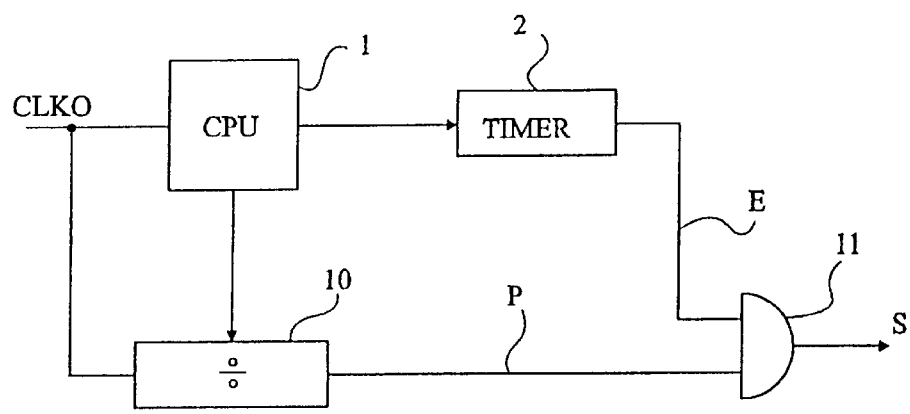
FIG. 3 is a schematic diagram of a pulse train generator according to one embodiment of the present invention.

FIG. 3 shows a schematic diagram of an embodiment according to the present invention in which a programmable divider 10 of a given clock frequency (for example, clock frequency CLK0 of a CPU 1) is associated with CPU 1 and a timer 2. The function of divider 10 is to supply a carrier P for modulating an envelope signal E issued by timer 2, which is programmed by CPU 1. Signals E and P are inputted into a modulating circuit, for example, an "AND" logic gate 11, which issues a modulated signal S in the form of pulse trains.

Figure 4:
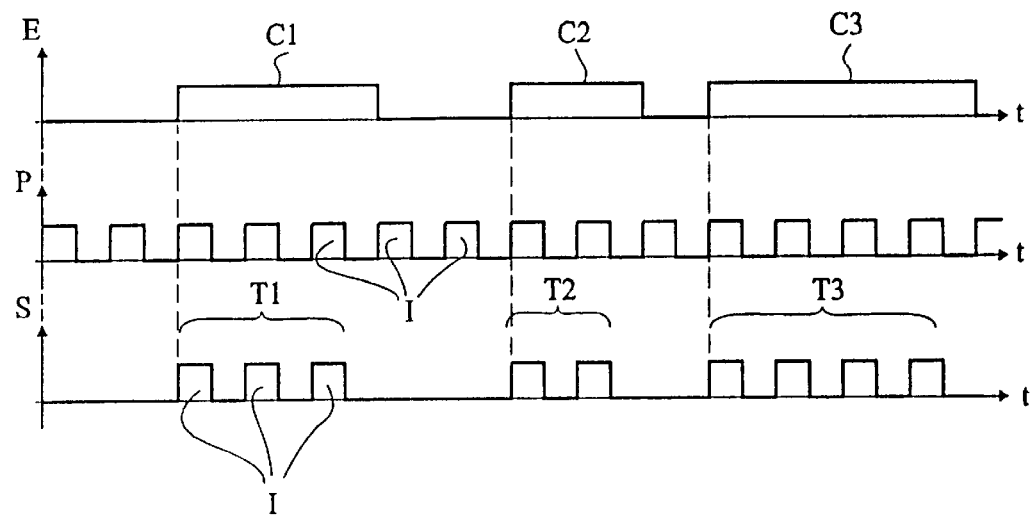
FIG. 4 illustrates three different timing diagrams of signals within the generator according to the present invention.

FIG. 4 shows timing diagrams illustrating signals produced during the operation of a generator according to the present invention. Signals P, E, and S, produced by different parts of the generator, are shown as pulse trains.

According to the present invention, signal E is obtained in a way similar to the way in which pulses are generated by a conventional circuit such as shown in FIG. 1, but register 4 (PS-REG) no longer supplies timer 2 any state control bit. Consequently, the width of square waves C1, C2, and C3 of signal E now corresponds to the width of the desired pulse trains, T1, T2, and T3 respectively, rather than the desired pulse width. Also, divider 10 supplies signal P for modulating signal E. The width of pulses I is determined by programming a dividing rate N of divider 10. In the same way, frequency and duty cycle of signal E is programmable by the CPU as being generated by the timer.

Figure 5:
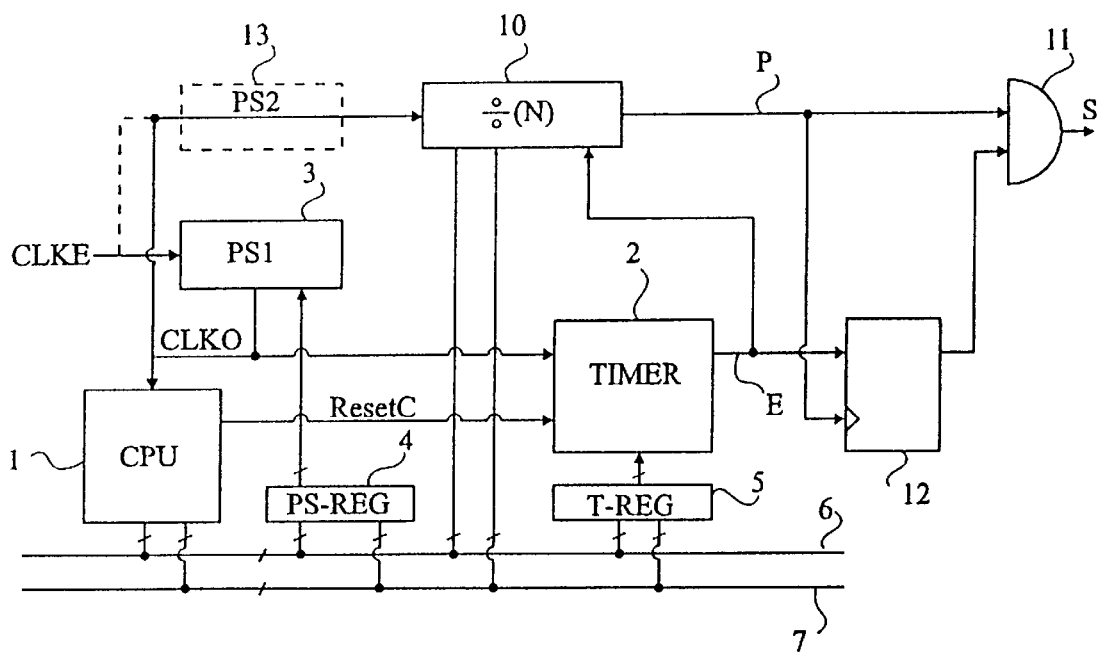
FIG. 5 is a block diagram of one embodiment of the generator according to the present invention shown in FIG. 3.

FIG. 5 shows, partially and in the form of a block diagram, an embodiment of a generator such as the one shown in FIG. 3. This generator includes, like the conventional generator of FIG. 1, a CPU 1, a timer 2, a prescaler (PS1) 3 and two registers 4 and 5.

In order to achieve the desired pulse width, divider 10 is programmed by CPU 1, for example, via a register (not shown), each time it is desired to modify the width of pulses I. In order to maintain a particular pulse width for a particular train, rising edges of pulses I of signal P are synchronized with the rising edges of signal E, issued by timer 2, and the falling edges of signal E are synchronized with the rising edges of signal P. Timer 2 is reset (ResetC) by CPU 1.

Preferably, synchronizing the rising edges of signals E and P is achieved by resetting divider 10 (ResetD) by a rising edge of signal E. Synchronizing the falling edge of signal E with the rising edge of signal P is achieved, preferably by the following construction. Signal E is directed to a first input of logic gate 11 via a flip-flop 12, and signal P is directed to a second input of logic gate 11 and to a clock input of flip-flop 12. Consequently the width of each square wave C of signal E corresponds to an integer multiple of the modulation carrier, that is, of signal P. Through such a construction a falling edge of signal E is thus only transmitted to gate 11 upon occurrence of a rising edge of signal P. Thus, the output of timer 2 is set-up again to correspond to an integer multiple of the period of signal P. Such synchronization guarantees that the width of all pulses I of a same train T1, T2, or T3 is identical. This is of particular interest in an application to infrared remote controls since it guarantees that a last pulse of a train is not cut-off by the falling edge of signal E and, thus, that the shape factor is respected on the entire pulse train.

Divider 10, for example, is a programmable divider which divides an external clock frequency or the CPU's frequency by an integer (N).

An alternative embodiment is shown in dotted lines in FIG. 5, where divider 10 is associated with a second prescaler (PS2) 13 receiving, as an input, the same external clock signal CLKE as prescaler 3. In such an embodiment prescaler 13 is also programmable by CPU 1, but the clock signal that it issues can be different from the clock signal CLK0 issued by prescaler PS1.

An advantage of such an alternative embodiment is that the generator can adapt to several pulse frequency standards, without having to change the external frequency. For example, this enables the generator to adapt to different pulse frequency standards of infrared remote controls.

For clarity, it has been assumed that the frequency of timer 2 is the same as the operating frequency of CPU 1. Timer 2 can however be monitored by a frequency which is lower than that of CPU 1, as it is often the case in practice and conventionally.

Preferably, the generator according to the present invention is programmable to operate either by modulating envelope signal E by signal P or by directly issuing signal E to operate as a conventional generator. For this purpose, a multiplexer can select between two inputs E or S the output of gate 11.

Another advantage of the present invention is that the CPU is only required to write into registers 4 and 5 twice per pulse train as opposed to twice per pulse.

Another advantage of the present invention is that it is possible to obtain, for a given clock frequency CLK0, shorter pulses I than produced by means of a conventional generator, since the pulse width is only limited by the width of pulses of signal P. In a conventional generator, the minimum width of a pulse is determined by the number of clock cycles CLK0 necessary to program the control bit in register 4, and then to program the counting threshold in register 5. On the other hand, according to the present invention, the minimum width of a pulse train, rather than a pulse, is determined by the number of clock cycles required for programming registers 4 and 5. Since the programming of divider 10 only happens when it is desired to modify the width of pulses I, which, in practice, does not occur in a same train, the CPU does not spend time programming each pulse and is thus free to perform other tasks.

Further, for a given pulse frequency, the present invention enables the reduction of the operating frequency of CPU 1 and, thus, the reduction of the circuit consumption which is linked, in particular, to this operating frequency. This advantage is particularly interesting in applications where the circuit is supplied by batteries, as it is the case for an infrared remote control.

Of course, the present invention is likely to have various alterations, modifications, and improvements which will readily occur to those skilled in the art. In particular, the practical implementation of programmable divider 10 is within the abilities of those skilled in the art. Similarly, the programming of CPU 1 according to the desired pulse trains is within the abilities of those skilled in the art based on the functional indications given hereabove. Further, it should be noted that registers 4 and 5, indicated as an example, can be replaced with a single register and that the organization of the register contents can be modified, provided that it respects the described functionalities. It should also be noted that timer 2 can be any conventional counter.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalent thereto.

What is claimed is:

1. A method for generating digital pulse trains by means of a microprocessor, comprising the steps of:

generating an envelope signal having at least one wave by means of a timer which is programmable by a CPU, the width of the at least one wave correspondes to the width of a train;

generating a carrier signal having a plurality of pulses having a predetermined frequency programmable by the CPU and a predetermined period; and modulating the envelope signal with the carrier signal, the carrier being synchronous with the envelope signal.

2. A method according to claim 1, wherein the width of a wave of the envelope signal is an integer multiple of the carrier period.

3. A method according to claim 1, wherein the carrier signal is obtained by dividing the frequency of an external clock signal.

4. A method according to claim 1, wherein the carrier is obtained by dividing the frequency of a clock signal of the CPU.

5. A method according to claim 1, wherein the step of generating an envelope signal can produce variable width waves.

6. A method according to claim 1, wherein the step of generating a carrier signal can produce variable width pulses.

7. A method according to claim 1, wherein the carrier signal pulse frequency is independent from a CPU frequency.

8. A method according to claim 7, wherein the modulated envelope signal corresponds to at least one pulse train having a pulse frequency substantially equal to the pulse frequency of the carrier signal, where the pulse frequency of the modulated signal is independent from the CPU frequency.

9. A method according to claim 8, wherein the frequency of the pulses of the pulse train is greater than the CPU frequency.

10. A method for generating pulse trains as in claim 1, wherein the step of generating an envelope signal having at least one wave, generates at least one square wave.

11. A method for generating pulse trains as in claim 10, wherein the step of generating a carrier signal having a plurality of pulses, generates a plurality of square waves.

12. A method according to claim 11, wherein the steps of generating an envelope signal and a carrier signal generate a rising edge of the at least one square wave of the envelope signal synchronous with a first rising edge of a first square wave of the carrier signal.

13. A method according to claim 12, wherein the steps of generating the envelope and carrier signals further generate a falling edge of the at least one square wave of the envelope signal synchronous with a second rising edge of a second square wave of the carrier signal.

14. A pulse train generator including a microprocessor comprising:

a CPU;

a timer programmed by the CPU for generating an envelope signal; and a programmable frequency divider for generating a carrier signal for modulating the envelope signal, wherein the modulated signal is the pulse train; and wherein the programmable divider includes a reset input receiving the envelope signal generated by the timer.

15. A generator according to claim 14, wherein the CPU is inputed a first clock signal generated by a first prescaler which receives an external frequency.

16. A pulse generator as in claim 14, wherein the programmable divider is inputted a second clock signal by a second prescaler which modifies the external frequency to a frequency different than the first clock signal.

17. A generator according to claim 14, wherein the envelope signal is an input to a flip-flop, and the carrier signal is a clock input to the flip-flop, and wherein an output of the flip-flop is a first input of an AND-type logic gate, and the carrier signal is a second input of the AND-type gate and wherein an output of the AND-type gate generates the pulse trains.

18. A pulse generator according to claim 17, wherein the timer generates an envelope signal having at least one wave and wherein the progranmable frequency divider generates a carrier signal having a plurality of pulses.

19. A pulse generator according to claim 18, wherein the programmable divider has a reset input which is reset by a rising edge of the at least one wave of the envelope signal.

20. A pulse generator according to claim 19, wherein the flip-flop is only triggered by a rising edge of a pulse of the carrier signal.

* * * * *